US005087508A

United States Patent [19]

Beck

[11] Patent Number: 5,087,508

[45] Date of Patent: Feb. 11, 1992

[54] DEW AND FROST RESISTANT SIGNS

[75] Inventor: Warren R. Beck, St. Paul, Minn.

[73] Assignee: Minnesota Mining and Manufacturing Company, St. Paul, Minn.

[21] Appl. No.: 530,648

[22] Filed: May 30, 1990

[51] Int. Cl.[5] ..... B32B 9/00

[52] U.S. Cl. ..... 428/195; 428/220; 428/323; 428/402; 428/457; 428/913; 40/454; 40/582; 40/612; 40/615

[58] Field of Search ..... 40/454, 582, 612, 615; 428/195, 402, 457, 323, 220, 913

[56] References Cited

U.S. PATENT DOCUMENTS

| | | | |
|---|---|---|---|
| 3,356,828 | 4/1965 | Furness | 219/365 |
| 4,259,198 | 3/1981 | Kreibich et al. | 252/70 |
| 4,487,856 | 12/1984 | Anderson et al. | 523/205 |
| 4,504,402 | 3/1985 | Chen et al. | 252/70 |
| 4,505,953 | 3/1985 | Chen et al. | 427/212 |
| 4,513,053 | 4/1985 | Chen et al. | 428/221 |
| 4,522,966 | 6/1985 | Funaki et al. | 524/114 |
| 4,587,279 | 5/1986 | Salyer et al. | 523/206 |
| 4,594,379 | 6/1986 | Funaki et al. | 524/114 |
| 4,642,266 | 2/1987 | Funaki et al. | 428/412 |
| 4,708,812 | 11/1987 | Hatfield | 252/70 |
| 4,726,134 | 2/1988 | Woltman | 40/582 |
| 4,755,425 | 7/1988 | Huang | 428/331 |
| 4,756,958 | 7/1988 | Bryant et al. | 428/320.2 |
| 4,844,976 | 7/1989 | Huang | 428/323 |

FOREIGN PATENT DOCUMENTS

| | | |
|---|---|---|
| 1243195 | 10/1988 | Canada . |
| 3208914 A | 9/1983 | Fed. Rep. of Germany . |
| 60-48493 | 3/1985 | Japan . |
| 60-188002 | 3/1987 | Japan . |

OTHER PUBLICATIONS

Woltman, H. L., "A Study of Dew and Frost Formation on Retro-Reflectors", Highway Research Record No. 70, National Academy of Sciences, 1965.

*Primary Examiner*—Patrick J. Ryan
*Attorney, Agent, or Firm*—Gary L. Griswold; Walter N. Kirn; Robert H. Jordan

[57] ABSTRACT

Signs comprising an outer layer having indicia thereon and a thermal reservoir behind the outer layer. The thermal reservoir contains at least one phase change material that, during periods of falling ambient temperature, yields a latent heat of transition thereby tending to maintain the temperature of the outer layer above what it would otherwise have been. As a result of such higher temperature, the outer layer of the sign is more resistant to formation of dew or frost thereon and retains a greater degree of legibility.

9 Claims, 1 Drawing Sheet

DEW AND FROST RESISTANT SIGNS

FIELD OF INVENTION

The present invention relates to signs adapted to resist formation of dew and frost thereon.

BACKGROUND

It is well known that droplets of water can condense from a humid atmosphere onto a relatively cool surface, e.g., as dew. See, for example, Woltman, H. L., "A Study of Dew and Frost Formation On Retro-Reflectors", Highway Research Record No. 70, National Academy of Sciences, 1965. Dew formation on signs typically occurs during periods of falling ambient temperature, e.g., during evening and nighttime, where objects such as signs tend to radiate heat and cool, causing the temperature of the objects to fall below the dew point of the surrounding air. Frost formation typically occurs under relatively cooler, but otherwise similar, conditions.

In the case of signs such as highway signs, particularly retroreflective signs, formation of dew or frost on the surface thereof may impair the visibility of the indicia thereon as the amount of light retroreflected by a retroreflective article is typically reduced by the presence of dew or frost thereon.

In FIGS. 1 and 2 of Huang U.S. Pat. No. 4,844,976, the loss of retroreflective brightness caused by formation of dew on the front surface of retroreflective signs is illustrated. That patent discloses application of a polymeric coating comprising silica and a transparent polymer to the front surface of retroreflective sheeting to increase soil and dew repellency. Huang U.S. Pat. No. 4,755,425 also discloses coatings which may be used on the front surfaces of retroreflective signs to impart greater dew repellency thereto. Funaki et al. U.S. Pat. No(s). 4,522,966, 4,594,379, and 4,642,266 disclose anti-fogging coating compositions that may be applied to the front surfaces of signs.

Generally, however, under conditions of very high humidity and/or rapidly falling ambient temperature, such coatings may not provide the desired degree of resistance to dew or frost formation.

SUMMARY OF INVENTION

The present invention provides signs incorporating means to resist and slow the fall of sign temperature commonly experienced during periods of falling ambient temperature. The signs provided herein exhibit improved resistance to dew and frost formation, even under conditions of high relative humidity and rapidly falling temperature, and thereby exhibit improved visibility relative to conventional signs. In the case of retroreflective signs, greater retroreflective brightness is retained. Accordingly, signs of the invention can provide improved performance and enhanced safety.

In brief summary, a novel sign of the present invention comprises at least one outer layer that has a display surface bearing indicia, e.g., speed limit or navigational information, and a thermal reservoir that is disposed behind the outer layer and contains at least one phase change material that undergoes at least one phase change between about −20° C. and about 40° C. Typically, it is preferred that the thermal reservoir contain two or more such phase change materials and that these phase change materials undergo phase changes at temperatures at least 10° C., and in some instances at least 5° C., apart from one another. In some preferred embodiments, signs of the invention also comprise optional heat barriers disposed to the opposite side of the thermal reservoir as the outer layer.

If desired, signs of the invention may have more than one outer layer having a display surface. In many embodiments, at least a portion of the display surface(s) of a sign of the invention is retroreflective.

Typically, signs of the present invention will be used in outdoor applications such as along roads and highways. An advantage of the present invention is that the thermal reservoir can typically be located within the sign and thus protected from deleterious effects due to exposure to sunlight, rain, wind, and abrasion. Another advantage of the present invention is that resistance to dew and frost formation is achieved with a passive mechanism, utilizing merely a rise in ambient temperature such as typically occurs during daytime hours to achieve dew and frost prevention without requiring active and intensive means such as an external power supply or manual or automated control for activation or operation. Accordingly, signs of the present invention do not require regular monitoring and control or frequent maintenance, and thus are well-suited for use in remote locations as well as highly traveled areas.

A further advantage is that signs of the invention may be made which combine thermal reservoirs as provided herein in combination with different dew fighting measures such as the dew repellent coatings disclosed in the aforementioned U.S. Pat. No(s). 4,755,425 and 4,844,976.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
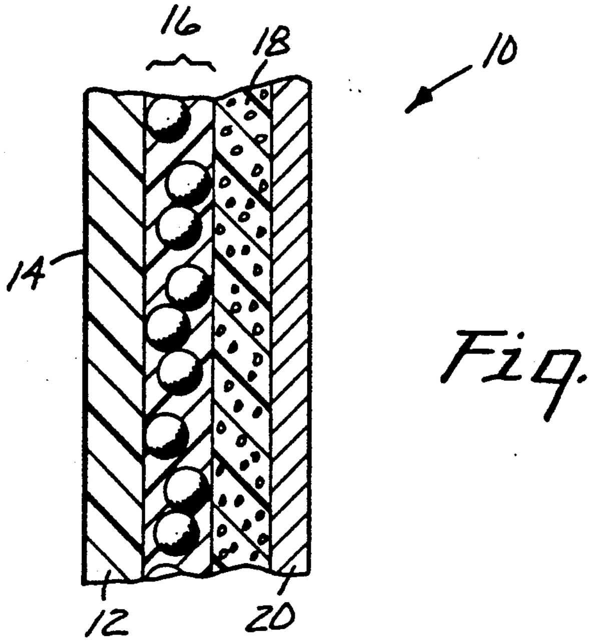
FIG. 1 is a cross-sectional view of a portion of an illustrative embodiment of a sign of the present invention.

An illustrative embodiment of a sign of the present invention is shown in FIG. 1, wherein sign 10 comprises outer layer 12 having display surface 14 bearing indicia, thermal reservoir 16 disposed behind outer layer 12, optional heat barrier 18 disposed behind thermal reservoir 16, and optional support panel 20, e.g., a conventional aluminum panel, disposed behind heat barrier 18.

Display surface 14 may typically bear such indicia as speed limit(s), road condition information, navigational information, etc. Typically, although it is not required for practice of the present invention, at least a part of display surface 14 is made of retroreflective material, e.g., retroreflective sheeting. In some embodiments, display surface 14 is retroreflective over substantially its entire surface, e.g., retroreflective indicia and retroreflective background distinguishable by having different colors and, in some instances, by having different retroreflective properties such as disclosed in Woltman U.S. Pat. No. 4,726,134.

Thermal reservoir 16 is disposed behind outer layer 12 and display surface 14 and comprises at least one phase change material that undergoes at least one phase change, e.g., from liquid to solid state or from one crystalline state to another, between about −20° C. and about 40° C. During periods of falling ambient temperature, thermal reservoir 16 will yield heat, thereby warming outer layer 12 and display surface 14 to temperatures above what they would otherwise have been. Thus, it is typically preferred that thermal reservoir 16 be in close contact with outer layer 12, or at least that portion of it for which high visibility is desired, i.e., the sign's effective area such as indicia and proximate background portions to permit desired heat transfer. Also, it is typically preferred that thermal reservoir 16 be substantially coextensive with outer layer 12 or at least the display surface's "effective area". It will be understood, however, that thermal reservoir 16 need not be coextensive with outer layer 12 or even the effective area thereof in order to achieve at least in part the advantages of the present invention.

Figure 2:
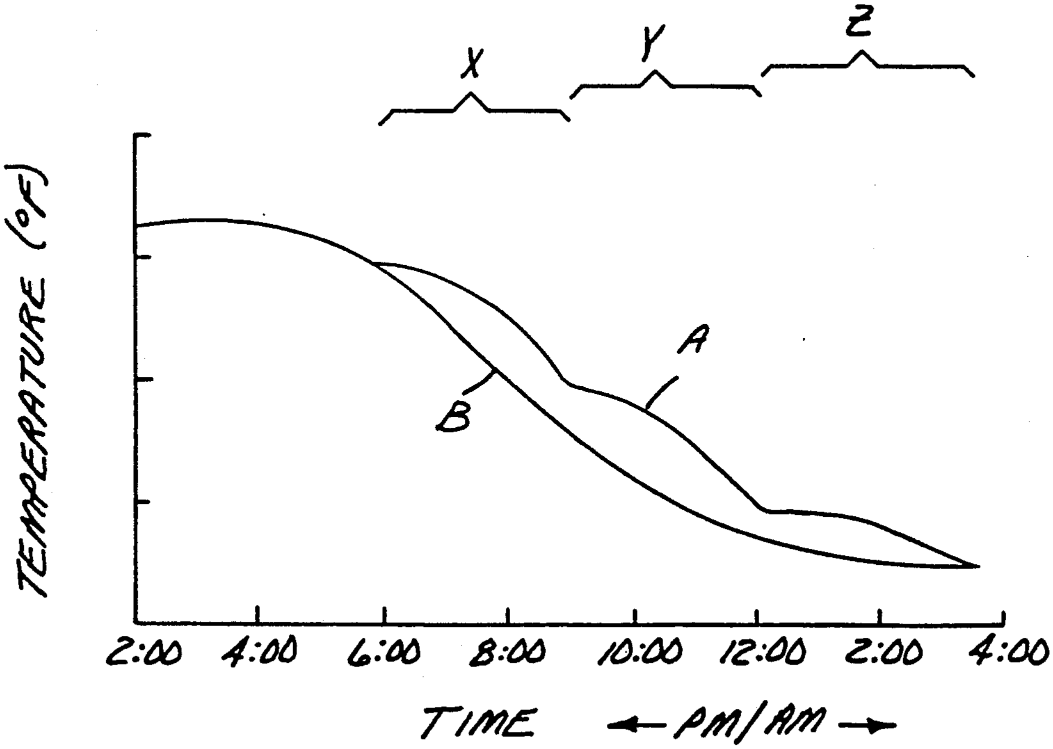
FIG. 2 is a graph illustrating the expected temperature of the surface of one embodiment of a sign of the present invention and the expected temperature of a typical conventional sign during a typical period of falling ambient temperature.

In accordance with the present invention, thermal reservoir 16 acts as a heat source and slows the fall in temperature of sign 10 during at least the initial portion of periods of rapidly falling ambient temperature, e.g., typically in excess of half the nighttime hours. Thermal reservoir 16 thus elevates the temperature of display surface 14 above what it would otherwise, thereby reducing or even substantially eliminating the condensation of moisture in the air thereon and thus reducing or preventing formation of dew or frost thereon. FIG. 2 is a graphical illustration of this effect as projected for an illustrative embodiment. Curve B represents the expected temperature of the face or display surface of a typical conventional sign, e.g., retroreflective sheeting on a simple aluminum backing, during evening and nighttime hours. Curve A represents the expected temperature of the display surface of a typical sign of the invention wherein the thermal reservoir contains phase change material(s) exhibiting three critical temperatures. As seen in the FIGURE, the temperature of the display surface of a sign of the invention (Curve A) is higher than that of a conventional sign (Curve B). Region X of Curve A represents the effect provided by the phase change material having the highest critical temperature (defined below). Regions Y and Z represent the effects provided by the phase change materials having the second highest and lowest critical temperatures, respectively.

Under conditions of falling temperature, materials are generally observed to emit a quantity of heat as their temperature drops. The capacity for such sensible heat is often referred to as specific heat which is sometimes expressed as calories/gram-degree, e.g., the specific heat of water is about 1 calorie/gram-° C. Many materials, however, yield far greater amounts of heat from the same quantity of material when a phase change occurs. For instance, the latent heat of transition of water when it passes from liquid to solid state at a pressure of about one atmosphere is about 80 calories/gram. When water freezes, it yields that quantity of heat to the surrounding environment, and when it melts, it absorbs that quantity of heat from the surrounding environment.

Thermal reservoir 16 contains one or more materials which undergo one or more such phase changes in an expected ambient temperature range. As used herein, "phase change" is meant to refer to temperature dependent changes between phases, e.g., between solid and liquid phases, sometimes referred to as liquid/solid transitions, and also to other changes between molecular arrangements, e.g., a change by a resin between two solid crystalline structures, sometimes referred to as solid/solid transitions, wherein the phase change which occurs under conditions of falling temperature yields a quantity of heat, i.e., a latent heat of transition. The temperature at which a phase change occurs is referred to herein as the "critical temperature" of the material. For instance, water freezes at 0° C., i.e., 0° C. is a critical temperature of water. Depending upon its properties, a phase change material used in the present invention may possess more than one critical temperature.

The advantages of the present invention may be obtained with a wide variety of phase change materials. Typically, it is preferred that the phase change occur without substantial change in volume, i.e., expansion or contraction. It will be understood, however, that phase change materials which undergo substantial changes in volume when undergoing a phase change may be used herein. For instance, water could be used as a phase change material in some embodiments of signs of the invention. In order to accommodate changes in volume, voids may be left in thermal reservoir 16 or the encapsulation members, e.g., tubes or pellets, or members of the sign may themselves shrink or expand in conformity with the volume of the phase change material, e.g., foams. Typically, it is preferred that highly rigid members not be used with phase change materials which exhibit substantial volume change when undergoing a phase change as such members may be subject to failure, thereby reducing the durability of the sign.

Phase change materials which have large latent heats of transition are typically preferred over those having relatively smaller latent heats of transition.

Although they may be essentially encapsulated in some embodiments, phase change materials used herein are preferably substantially environmentally safe. Also, the phase change materials are preferably able to undergo many cycles of phase change without degradation such that signs of the invention can be constructed for long term durability.

Determination of an optimum thermal reservoir, capable of emitting desired quantities of heat in desired temperature ranges will depend in part upon the typical conditions under which dew and frost formation occur at a particular location. For instance, in southern Minnesota dew formation on signs has been observed to be particularly troublesome during summer months when temperatures may range from daytime highs of 90° F. (32° C.) or more to nighttime lows of about 50° F. to 60° F. (10° C. to 16° C.). In the fall, frost formation on signs has been observed during periods when temperatures range from daytime highs of about 40° F. to 50° F. (4° C. to 10° C.) to nighttime lows of about 20° F. to 30° F. (−7° C. to −1° C.). In southern Florida dew formation has been observed throughout the year, being particularly troublesome during the summer when the temperature ranges from daytime highs of 90° F. (32° C.) or more to nighttime lows of about 60° F. to 70° F. (16° C. to 21° C.). A sign of the invention is preferably designed in accordance with the typical ambient conditions under which dew or frost formation occurs at the location of the sign, i.e., using phase change material(s) with critical temperatures in the temperature range at which dew and/or frost formation is encountered.

During periods of rising and warm ambient temperatures, e.g., during the day, the phase change material(s) in thermal reservoir 16 responsively rise in temperature, absorbing substantial quantities of heat and, when appropriate temperatures are reached, undergoing a phase change. Subsequently, when ambient temperatures fall, e.g., during evening and nighttime hours, the phase change materials release the stored heat, particularly when reaching the critical temperatures, thereby causing the face of the sign to be warmer than it would otherwise have been. Because of the relatively higher temperature of the face of the sign, dew and/or frost formation is substantially reduced or even eliminated, even under conditions of high relative humidity.

In some embodiments, thermal reservoir 16 containing phase change material that exhibits a single critical temperature will provide satisfactory performance. For many applications of the present invention, however, it is preferred that thermal reservoir 16 contain two or more phase change materials selected such that they undergo phase changes at temperatures at least about 5° C. apart, i.e., their critical temperatures are at least about 5° C. apart. In some embodiments, thermal reservoir 16 more preferably contains phase change materials which provide four or more critical temperatures. In this way, the beneficial warming effect of thermal reservoir 16 and resultant resistance to dew or frost formation, are distributed over a wider portion of the ambient temperature region. Also, if the sign is heated to only a slightly elevated temperature during the day, typically at least the phase change material having the lowest critical temperature is activated for effective performance at night.

In order to optimize dew and frost resistance over wider temperature ranges and longer periods of time in such instances, it is typically preferred that thermal reservoir 16 exhibit a large heat capacity, e.g., by using phase change material which has a large heat of fusion or using large amounts of phase change material. Further, it is typically preferred that the flow of heat from thermal reservoir 16 to outer layer 12 and display surface 14 be regulated such as by provision of insulation between thermal reservoir 16 and display surface 14. In some instances, insulation may be provided by outer layer 12, e.g., if it is a polymer panel of appropriate thickness, or by an additional member (not shown) incorporated in the sign structure, e.g., between outer layer 12 and thermal reservoir 16, or within thermal reservoir 16, e.g., a foam binder material may be used therein. Such regulation of heat flow tends to slow the rate at which thermal reservoir 16 emits heat to display surface 14, however, it should not slow the flow of heat to such a degree that display surface 14 cools too quickly during periods of falling ambient temperature, resulting in impairment of desired resistance to dew and frost formation. Determination of optimum insulation for a particular embodiment will depend in part upon expected ambient temperature and humidity conditions and characteristics of thermal reservoir 16 and display surface 14, and may be readily determined with trial and error.

Some illustrative examples of materials which may be used in thermal reservoir 16 include crystalline resins such as are disclosed in Kreibich et al. U.S. Pat. No. 4,259,198 and Anderson et al. U.S. Pat. No. 4,487,856. Bryant U.S. Pat. No. 4,756,958 discloses fibers with thermal storage properties which may be used in thermal reservoirs of the invention. Chen et al. U.S. Pat. No(s). 4,504,402, 4,505,953, 4,513,053, and Hatfield U.S. Pat. No. 4,708,812 disclose encapsulated phase change materials and methods for making same which may be used in practice of the present invention. Other phase change materials which are suitable for certain applications will become known to those skilled in the art.

Thermal reservoir 16 may essentially comprise a sheet or mass of phase change material as disclosed in Furness U.S. Pat. No. 3,356,828. Typically, however, it is preferred that the phase change material be in encapsulated form as described above or in other small conveniently handled size. An advantage of forms such as the capsules described above is that they are typically easily handled, making fabrication of a sign of the invention more convenient. Other advantages of using encapsulated phase change materials are that encapsulated phase change materials having different critical temperatures may be interdispersed such that thermal reservoir 16 can be provided with substantially uniform properties across its area, and that full benefit of having multiple phase change materials can be provided along substantially the entirety of display surface 14. A further advantage is that an optimum combination of phase change materials for a particular sign application may be conveniently provided using encapsulated materials. Capsules of phase change material may be assembled in tubes, or may be encased in cured masses of capsules and binder material. If desired, phase change materials may be placed directly in sealed tubes or other chambers in unencapsulated form.

In an alternative embodiment, thermal reservoir 16 contains a honeycomb structure having cells which are filled with phase change materials, in unencapsulated, encapsulated, or other form as desired. An advantage of this embodiment is that thermal reservoir 16 may be constructed to impart increased structural support to sign 10 in addition to the resistance to dew and frost formation which is discussed above.

Optionally, sign 10 may further comprise heat barrier 18 on the opposite side of thermal reservoir 16 as outer layer 12. Heat barrier 18 insulates thermal reservoir 16 such that during periods of falling ambient temperature the greater portion of heat yielded by thermal reservoir 16 passes toward outer layer 12 rather than directly to the environment. In this manner, greater resistance to dew and frost formation from the same thermal reservoir is achieved.

Another advantage of optional heat barrier 18 is that it may impart additional structural integrity, e.g., increased load bearing ability, dimensional stability, rigidity, etc., to sign 10. Illustrative examples of materials which may be used in optional heat barrier 18 include wood panels, foam sheets, foam core panels, etc.

Optionally, sign 10 may further comprise support panel 20 behind thermal reservoir 16, or if sign 10 has heat barrier 18, behind heat barrier 18. Support panel 20 can impart additional structural integrity to sign 10. Illustrative examples of materials which may be used in optional support panel 20 include wood, metal, or polymeric panels.

EXAMPLES

The invention will be further explained by the following illustrative examples which are intended to be nonlimiting.

EXAMPLE 1 AND COMPARATIVE EXAMPLE A

A thermal reservoir was made as follows. A square panel, 2 feet by 2 feet (120 centimeters by 120 centimeters) in size, of 1 inch (2.5 centimeters) thick pressed board coated on the interior side with TEFLON was laid flat and ⅜ inch (1 centimeter) TEFLON coated square aluminum rods laid around the perimeter thereof to provide a mold. A layer of 0.75 ounce/yard$^2$ (25 15 grams/meter$^2$) fiberglass cloth was then laid in the mold cavity. The mold cavity was divided into four (4) longitudinal regions of approximately equal width, referred to as Zone A, Zone B, Zone C, and Zone D, respectively.

Two phase change materials were used. The first was 1-dodecanol, from Aldrich Chemical Company, having a critical temperature or phase change point of about 75° F. to 80° F. (24° C. to 27° C.). The second was a mixture of 1 part WITCO 85010-1 Wax, having a critical temperature of about 50° F. to 60° F. (10° C. to 16° C.), from Witco Chemical Company, and 1 part 1-dodecanol. A number of thin walled ⅜ inch (1 centimeter) O.D. aluminum tubes were filled with one of the phase change materials.

When the sign was assembled, tubes containing phase change materials were arranged in single plane, packed closely together, with about 12 tubes in each 6 inch wide zone. Zone A contained only tubes filled with the first phase change material, Zone B contained tubes filled with the first phase change material alternated with tubes filled with the second phase change material, Zone C contained only tubes filled with the second phase change material, and Zone D contained syntactic foam only. The foam comprised 1400 grams of COREZYN 95-BA-26, a curable polyester from the Commercial Resins Division of Inter-Plastic Corporation, 2000 cubic centimeters of hollow glass microspheres, about 10 to 100 microns in diameter, and 14 grams of methyl ethyl ketone phosphate as catalyst. After filling the mold cavity, a second layer of fiberglass cloth and TEFLON coated pressed board was laid thereover, and the foam allowed to cure. After curing, the mold was disassembled to yield a thermal reservoir.

A piece of SCOTCHLITE Retroreflective Sheeting from 3M was laminated to one side of the thermal reservoir to yield Sign 1.

Comparative Sign A was a conventional sign comprising a piece of the same retroreflective sheeting laminated to an aluminum backing panel.

Sign 1 and Comparative Sign A were exposed for a period of several days and nights in Dunedin, Florida, during the months of November and December. They were kept in open, shaded carports during the day and placed outside on evenings when dew formation was observed on other objects. During November, the temperature typically ranged from highs of about 80° F. (27° C.) to lows of about 60° F. (15° C.) and dew formation was experienced on most nights. During December, the highs were typically between about 60 and 80° F. ° C.) and the lows were typically between about 40 and 50° F. (4 and 10° C.), and the relative humidity was lower with dew formation being observed less frequently.

It was observed that Zones A and B of Sign 1 resisted dew formation at least until early morning, i.e., about 4 A.M., even on nights of heavy dew formation. Zone C was observed to exhibit resistance to dew formation on the two coolest nights when ambient temperatures reached about 60° F. or below, but was less effective than Zones A and B when temperatures did not fall to that point. It was observed during the latter portion of the test period when the nights were cool enough for Zone C to exhibit its most effective resistance to dew formation that Zone A did not exhibit as effective performance as it had during the warmer portion of the test period. In view of the fact that during the latter portion of the test period the days tended to somewhat cooler also, it is believed that Zone A was not warmed sufficiently during the days to be activated. Zone D was typically observed to resist dew formation for about 1 hour and Comparative Sign A was observed to resist dew formation for only about ½ hour after being placed outside.

EXAMPLE 2

The following is an illustrative example of a proposed dew and frost resistant sign.

A thermal reservoir could be made as follows. A square panel, 2 feet by 2 feet (120 centimeters by 120 centimeters) in size, of 1 inch (2.5 centimeters) thick pressed board coated on both sides with TEFLON is laid flat and ⅜ inch (1 centimeter) square aluminum rods laid around the perimeter thereof to provide a mold. A layer of 0.75 ounce/yard$^2$ (25 grams/meter$^2$) fiberglass cloth is placed in the mold.

A filling compound comprising a curable polyester resin such as that used in Example 1 filled with a mixture of three encapsulated phase change materials, having critical temperatures of 40° F. (4° C.), 60° F. (15° C.), and 80° F. (27° C.), respectively, is poured into the mold, and then another piece of the fiberglass cloth laid thereover and a second TEFLON-coated pressed board panel laid thereon.

After polymerization, the mold is disassembled to yield a self-supporting thermal reservoir. A piece of SCOTCHLITE Retroreflective Sheeting from 3M is laminated to one side of the reservoir and a 1 inch (2.5 centimeters) thick piece of polystyrene foam insulation is laminated to the other side as a heat barrier.

In accordance with the present invention, it is believed that the resultant sign would provide effective resistance to dew and frost formation over a wide temperature range, thereby improving the legibility of the sign.

Various modifications and alterations of this invention will become apparent to those skilled in the art without departing from the scope and spirit of this invention.

What is claimed is:

1. A sign comprising at least one outer layer that has a display surface bearing indicia and a thermal reservoir disposed behind said outer layer, said thermal reservoir containing at least one phase change material that undergoes at least one phase change between about −20° C. and about 40° C.

2. The sign of claim 1 wherein said thermal reservoir contains two or more of said phase change materials, said phase change materials undergoing phase changes at temperatures at least 5° C. apart from one another.

3. The sign of claim 2 wherein said thermal reservoir contains two or more of said phase change materials, said phase change materials undergoing phase changes at temperatures at least 10° C. apart from one another.

4. The sign of claim 2 wherein said phase change materials are uniformly dispersed such that the properties of said thermal reservoir are uniform across its entire area.

5. The sign of claim 1 wherein said phase change material is encapsulated.

6. The sign of claim 5 wherein thermal reservoir further comprises binder material in which said encapsulated phase change material is distributed.

7. The sign of claim 1 wherein at least a portion of said display surface is retroreflective.

8. The sign of claim 1 further comprising one or more other outer layers having such display surfaces.

9. The sign of claim 1 further comprising a heat barrier disposed on the opposite side of said thermal reservoir as said outer layer.

* * * * *